Figure 1:
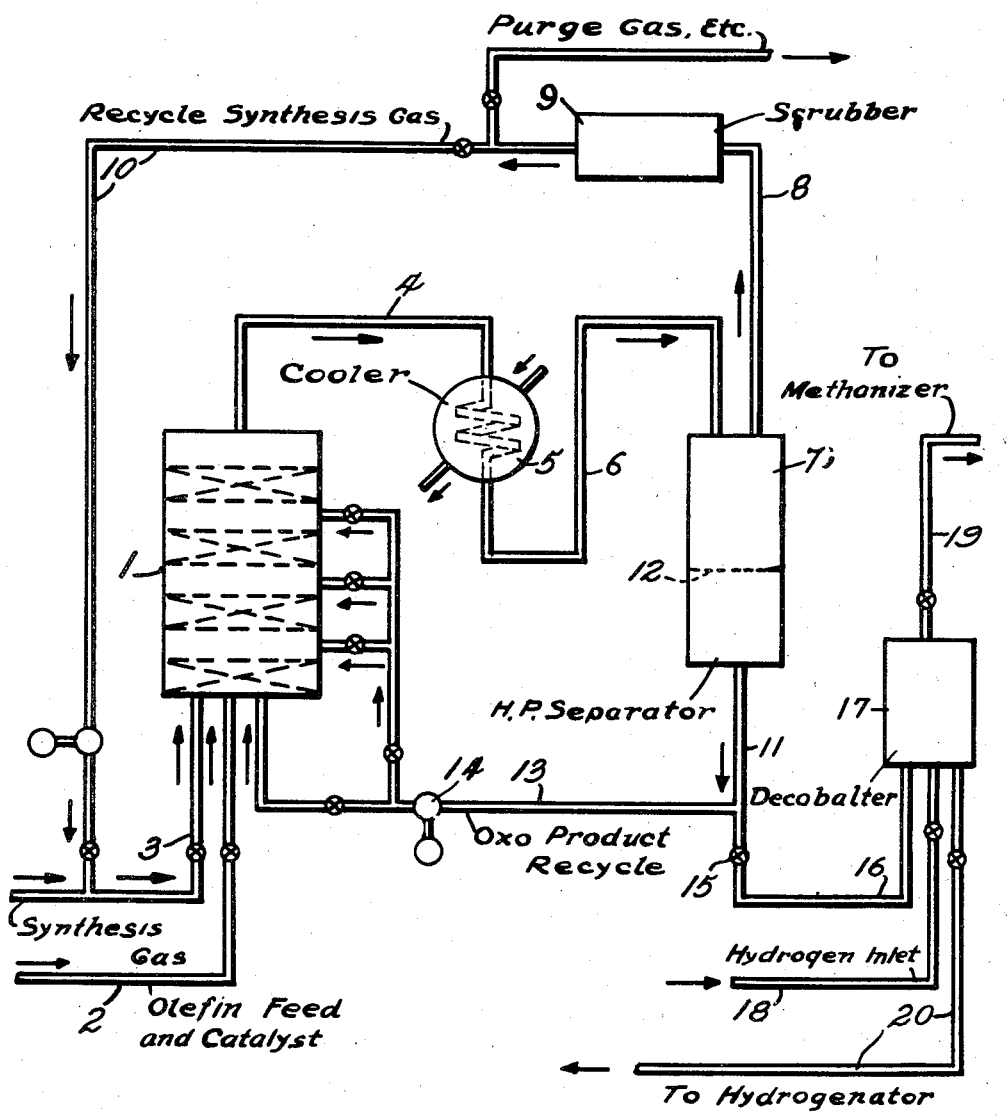

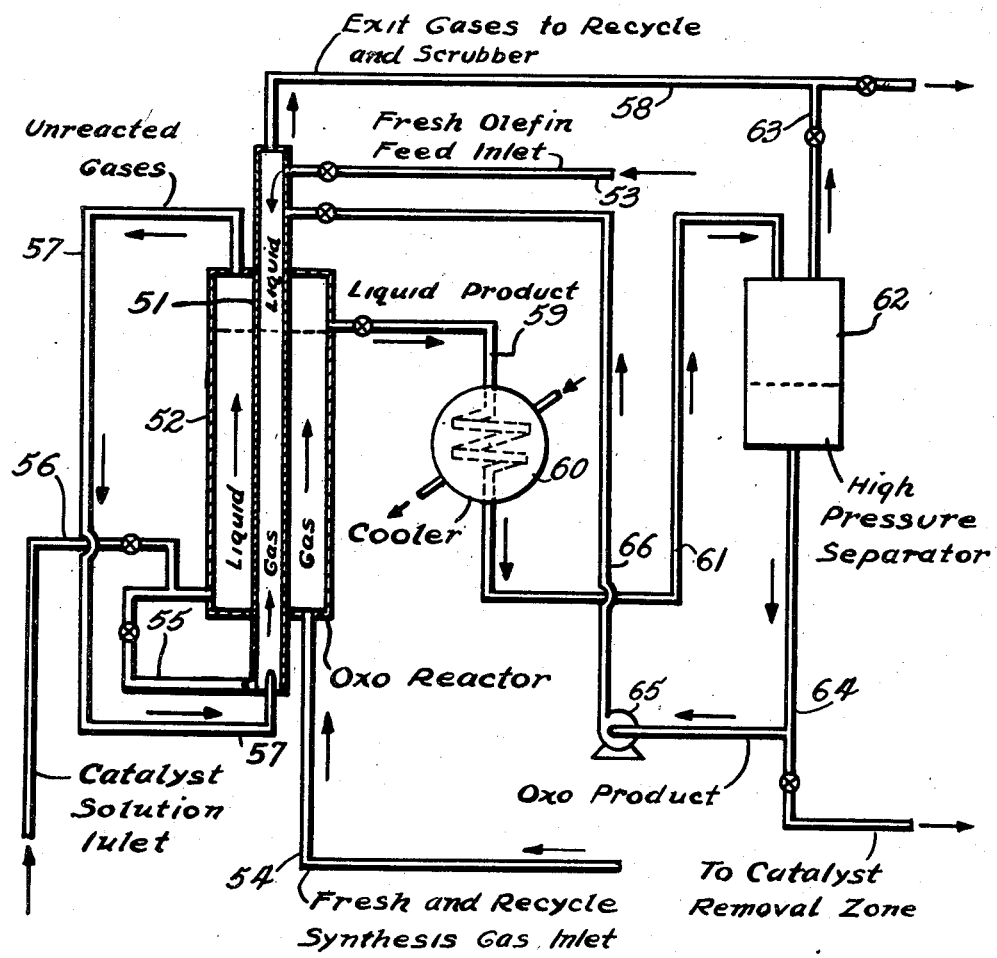
FIG.-II

Patented June 19, 1951

2,557,701

UNITED STATES PATENT OFFICE 2,557,701

CATALYTIC REACTION OF OLEFINS WITH CARBON MONOXIDE AND HYDROGEN

Warren M. Smith, Baton Rouge, La., assignor to Standard Oil Development Company, a corporation of Delaware Application March 19, 1948, Serial No. 15,802

4 Claims. (Cl. 260—604)

The present invention relates to the preparation of oxygenated organic compounds by the reaction of carbon compounds containing olefinic linkages with hydrgen and carbon monoxide in the presence of a carbonylation catalyst. More specifically this invention relates to an improved process for controlling the heat of reaction in the carbonylation reaction zone and of maintaining high concentrations of active catalyst species in said zone.

It is well known in the art that oxygenated organic compounds may be synthesized from organic compounds containing olefinic linkages by a reaction with carbon monoxide and hydrogen in the presence of catalyst containing metals of the iron group in a two stage process in which predominantly aldehydes and minor proportions of ketones and alcohols are formed in a first step in the presence of a carbonylation catalyst comprising metals of the iron group, and the products from the first step may then be hydrogenated in a second step to convert the organic carbonyl compounds containing one more carbon atom than the olefinic starting material to the corresponding alcohol. Likewise, if desired, the aldehydes may be converted to the corresponding fatty acids by oxidation. The second stage hydrogenation catalyst may comprise any known reduction catalyst such as metallic supported or unsupported nickel, copper chromite, sulfactive catalysts such as oxides and sulfides of tungsten, nickel and molybdenum and the like.

This carbonylation or Oxo reaction by which name this process is generally known, provides a particularly attractive method of preparing primary alcohols to supply the large market for plasticizers, detergents, solvents and the like. Amenable to the reaction are long and short chained olefinic compounds, not only hydrocarbons but most other organic compounds having a carbon-to-carbon olefinic linkage such as unsaturated alcohols, acids, esters and the like. Straight and branch chained olefins and di-olefins such as propylene, butene, butadiene, pentene, pentadiene, hexene, heptene, styrene, olefin polymers such as di and tri-isobutylene, hexene and heptene dimers, polypropylenes, olefinic fractions from the hydrocarbon synthesis process, thermal or catalytic cracking operations and other sources of hydrocarbon fractions containing such olefins may be used as starting materials depending on the nature of the final product desired. The synthesis gas mixture fed to the first stage may be any desired ratio of $H_2$ to CO, preferably within the limits of 0.5 to 2 volumes hydrogen per volume of carbon monoxide. The conditions for reacting olefins with the synthesis gases vary somewhat in accordance with the nature of the olefin feed, the reaction being generally conducted at pressures in the range of from about 1500 to 4500 p. s. i. g. and the ratio of synthesis gas to olefin may vary widely; in general about 2500 to 25,000 cubic feet of $H_2+CO$ per barrel of olefin feed are employed.

The catalyst for the first stage of the process is usually employed in the form of an oil soluble compound of the catalytically active carbonylation metal. Thus there have been employed the salts of the metals such as iron or cobalt, and high molecular weight fatty acids such as stearic, oleic, naphthenic, linoleic and the like. Catalyst concentrations may vary from about 0.5 to 5.0% by weight of the catalyst salt based on the olefinic feed. The first stage or carbonylation reaction is generally carried out at temperatures in the range of from about 250° to 450° F. depending upon the nature of the olefin and other reaction conditions. In general, the lower olefins will react at lower temperatures than the high molecular weight olefins. The carbonylation reaction is an exothermic one, with a heat release of the same high order of magnitude as in the hydrocarbon synthesis process, about 35 to 50 Kcal/gram-mol olefinic double bond reacted and, therefore, careful temperature control is required in the reaction zone to prevent decomposition of cobalt carbonyl to metallic cobalt and also to prevent formation of secondary reaction products and undesired reactions such as hydrogenation of the olefin, formation of hydrocarbon synthesis products, polymerization of Oxo products and the like. At 3000 p. s. i. g. (1500 p. s. i. g. CO partial pressure) cobalt carbonyl starts to decompose at an appreciable rate above 350° F., thus decreasing the concentration of active catalyst. On the other hand, temperatures are preferably kept above 300° F. so as to keep the reaction rate up to a reasonable figure to insure high olefin conversions at reasonable feed rates.

Heretofore, this cooling has been accomplished by injection of cooled recycle synthesis gas into the Oxo reactor. This process is unsatisfactory because at the relatively low temperature levels of the carbonylation reaction and the low temperature gradient within the reactor, about 30°–100° F., there are required excessively large amounts of cooling gas, on the order of about 25,000–100,000 cubic feet per barrel of olefin treated. This cooling gas must also first be scrubbed with suitable liquid to remove cobalt carbonyl to prevent line plugging and thus high gas rates would mean large quantities of scrubbing liquid which must subsequently be run through a catalyst removal zone.

Another problem inherent in a liquid phase Oxo process in which the catalyst is supplied as an oil-soluble soap of the carbonylation metal is the conversion of such catalytically inactive oil soluble compound into the active species of the catalyst. There is good ground for believing that the active form of the carbonylation catalyst may be the carbonyl of the metal, such as cobalt carbonyl and iron carbonyl, or some other molecule arising from the interaction of cobalt or iron and their compounds with CO.

It is known that there is a definite time lag within the reactor which is required to convert the catalyst salt of the fatty acid to the carbonyl and in a continuous process in which olefin, containing in solution the catalyst salt, and also the synthesis gases are fed concurrently into the bottom of the Oxo reactor, the actual interaction of the cobalt carbonyl and the olefin feed does not occur in the lower portion of the reactor because in that portion the cobalt carbonyl has first to be synthesized by interaction of carbon monoxide in the feed gas with the catalyst salt dissolved in the olefin feed; thus a substantial portion of the reactor plays no part in the catalytic conversion of the olefins to oxygenated products.

It is the object of the present invention to disclose an improved process whereby the heat of reaction from an adiabatic Oxo reactor may be advantageously controlled without the disadvantages inherent in recirculating large volumes of cooling gases. In this disclosure, the term "adiabatic Oxo reactor" refers to a large Oxo reactor in which the ratio of wall surface to reactor volume is small, and thus the heat dissipated by transfer through the walls is relatively small. Such a reactor is generally externally insulated. It is also the object of this invention to disclose means whereby high catalyst concentrations in active form may be maintained throughout the entire Oxo reactor. Other objects and advantages will appear hereinafter.

These objects may be accomplished by recirculating to the reactor the first stage Oxo product after cooling and separation of gases in a high pressure separator or "Abstreifer." This Oxo product has a much higher heat capacity than an equivalent volume of gas and hence a substantially smaller amount is required for such recycling.

An additional advantage of this process lies in the fact that the first stage Oxo products contain dissolved the metal carbonyls such as iron or cobalt carbonyl which function as the catalyst for the reaction. Recycle of this material to the reactor inlet provides a high concentration of the catalytic material at the reactor inlet where it is capable of accomplishing a considerable degree of reaction before the cobalt salts introduced to the reactor dissolved in the fresh feed are converted to cobalt carbonyl and are able to function as catalysts. This recycle of Oxo products at pressures of approximately the same order of magnitude as that obtaining in the Oxo reactor may if desired be carried out under gravity providing a sufficient liquid level is maintained in the high pressure separator. The recycle material may be introduced with the fresh feed into the bottom of the zone or if desired may be distributed for better temperature control into different zones within the primary reactor.

The present invention and its application will best be understood from the more detailed description hereinafter wherein reference will be made to the accompanying drawings which are schematic illustrations of a system suitable for carrying out a preferred embodiment of the invention.

Referring first to Figure I, an olefinic hydrocarbon having one carbon atom less than the number of carbon atoms in the desired resulting oxygenated compound and preferably alkali washed prior to reaction is fed through feed line 2 to the bottom portion of primary reactor 1. Reactor 1 comprises a reaction vessel which may, if desired, be packed with non-catalytic material such as Raschig rings, porcelain chips, ceramic material, pumice and the like. Reactor 1 may be divided into discrete packed zones separated by any suitable means such as support grids, etc. or it may comprise but a single packed zone, or it may contain no packing.

The olefinic feed preferably contains dissolved therein 1–3% by weight of cobalt naphthenate based on the olefin. It is understood that other compounds of cobalt or compounds of iron or mixtures of compounds of cobalt and iron soluble in the olefins may also be used equally effectively. Simultaneously a gas mixture containing hydrogen and carbon monoxide in the approximate ratio of 0.5 to 2 volumes of hydrogen per volume of carbon monoxide is supplied through line 3 to primary reactor 1 and flows concurrently through reactor 1 with said olefin feed. Reactor 1 is preferably operated at a pressure of about 2500–3500 p. s. i. g. and at a temperature of from about 250° to 450° F. depending upon the olefin feed and other reaction conditions. The rate of flow of synthesis gases and olefins through reactor 1 is so regulated that the desired conversion level of the olefin is obtained.

The carbonylation reaction in reactor 1 is carried out substantially adiabatically, that is no external cooling means such as by tubes or coils is provided but the cooling and temperature control is carried out in the process of the present invention as disclosed below. Liquid oxygenated reaction products containing catalyst in solution and unreacted synthesis gases are withdrawn from an upper portion of high pressure reactor 1 and are transferred through line 4 to cooler 5 in which are employed any conventional means of cooling, and from thence via line 6 to high pressure separator 7 where unreacted gases are withdrawn overhead through line 8 scrubbed in scrubber 9 of entrained liquid and cobalt carbonyl and used in any way desired; they may be recycled through line 10 to synthesis gas feed line 3 or purged. Liquid Oxo products are withdrawn from high pressure separator 7 through line 11. A liquid level 12 is maintained in separator 7.

A stream of Oxo liquid product containing dissolved therein relatively high concentrations of cobalt carbonyl is withdrawn from line 11 through line 13 and may be passed through booster pump 14 to the lower portion of reactor 1. The amount of Oxo products recycled is a function of the amount of cooling required and desired in Oxo reactor 1 the temperature gradient through reactor being in the range of from about 30°–100° F. The cooled recycle product from high pressure separator 7 is at a temperature level 200° to 250° F. lower than that maintained in Oxo reactor 1. The liquid level 12 in high pressure separator 1 may if desired be so maintained that recycling of Oxo product to reactor 1 may be accomplished by gravity alone, thus avoiding a booster pump. The cobalt carbonyl thus added along with the olefin feed thus enables the Oxo reaction to proceed throughout the full length of the reactor rather than only at an upper portion. Recycle liquid product may also be injected into other sections of reactor 1 in addition to the bottom section to obtain closer temperature control throughout the whole reactor. Approximately a total of 300 to 700 volume per cent of liquid Oxo product on the fresh olefin feed may be used for temperature control purposes. Liquid Oxo products not recycled to reactor 1 may be withdrawn through pressure release valve 15 and through line 16. Such liquids comprise any unreacted olefin as well as aldehydes, other Oxo products and dissolved catalyst compounds. This liquid is passed through line 16 to catalyst removal zone 17 wherein by suitable heat treatment at about 300°–400° F. the dissolved catalyst is reduced and decomposed to the metal.

A stream of hydrogen comprising gas may be admitted to catalyst removal zone 17 through line 18 the purpose of such hydrogen being to aid in stripping and removing the evolved carbon monoxide from catalyst removal zone 17. The said catalyst removal zone 17 may if desired be a packed vessel and the decomposed catalyst depositing as metal cobalt on the packing, the packing may consist of any desired non-catalytic refractory metal such as Raschig rings, pumice and the like. However, if desired the catalyst removal zone 17 may not contain packing. The catalyst removal zone may be operated at pressures from about 50 to 3000 p. s. i. g. The gas stream comprising hydrogen and carbon monoxide produced by decomposition of the cobalt carbonyl may be removed from catalyst removal zone 17 through line 19 and transferred to another portion of the system as to a hydrogenation zone or to a methanization zone (not shown) in which the carbon monoxide is catalytically reduced by processes known per se to form a gas mixture consisting of hydrogen and methane which may be used for subsequent hydrogenation or as purge gas in catalyst removal zone 17.

The liquid Oxo reaction product now substantially free of carbonylation catalyst is withdrawn from the catalyst removal zone 17 through the line 20 and may be treated in any desired manner such as being transferred to a subsequent hydrogenation stage for conversion to alcohols or to an oxidation stage (both not shown) for oxidation to fatty acids.

The disclosure admits of many modifications and still remains within the spirit of the invention. Thus Figure II discloses a modified first stage reactor suitable for carrying out the Oxo process embodying the principle of the invention, of recycling Oxo product under substantially Oxo reactor pressures and also embodying other features advantageous in controlling heat of reaction and insuring maximum olefin conversion. The reactor consists of an inner reactor tube 51 concentric with an outer tube 52 connected as shown in Figure II. Fresh olefin feed with or without added catalyst is introduced into the top of inner tube 51 through line 53 and passes downflow countercurrently to the synthesis gases ($H_2+CO$) mixture introduced through line 54 into the outer reactor tube 52. From the bottom of inner tube 51 the liquid is transferred through line 55 to the bottom portion of outer tube 52 through which it flows upwardly. Transfer line 55 between the inner and outer tubes may incorporate a cooling coil. Catalyst solution such as cobalt oleate or naphthenate dissolved in olefin feed may be added if desired through line 56 into the bottom portion of outer tube 52. The fresh and recycled synthesis gases are introduced into the bottom portion of outer tube 52 through line 54 and pass upflow concurrently with a liquid feed. Unreacted synthesis gases and cobalt carbonyl are taken overhead from the disengaging zone from the top of outer tube 52 and are returned by way of line 57 to the bottom of inner tube 51 where they pass upflow countercurrent to the liquid feed and are withdrawn from inner tube 51 through line 58 and transferred to the gas scrubbing and recycle system.

Liquid Oxo product is withdrawn from outer tube 52 through line 59, then passed to cooler 60 and the cooled products transferred to high pressure separator 62 through line 61. Separator 62 effects separation of the bulk of the unreacted synthesis gases and also of some of the cobalt carbonyl. The gases are withdrawn overhead through line 63 and may be scrubbed to remove cobalt carbonyl before being, if desired, recycled to the first stage. Liquid Oxo reaction product is withdrawn from high pressure separator 62 through line 64 and transferred to the catalyst removal zone as previously described; a portion sufficient to insure the desired cooling and temperature control of the first stage reactor is withdrawn from line 64 and is pumped through booster pump 65 and line 66 to inner reactor tube 51. Thus by introducing the desired ratio of fresh cold feed and cooled recycle Oxo product into the top of inner tube 51 and by employing if desired a cooling coil in the liquid transfer line 55 the heat of reaction may be controlled at the desired temperature level by the concentric heat exchange relationship employed. Also the mixture of fresh feed and recycle Oxo product passing downflow countercurrent to the gas stream in the inner tube serves to scrub out entrained cobalt carbonyl from the exit synthesis gases thus returning catalytic metal to the reaction zone and minimizing separation of solid cobalt or cobalt carbonyl in the gas recycle lines. The incoming olefin feed thus also comes in contact immediately with active cobalt carbonyl provided by the exit synthesis gases and by the recycled Oxo products insuring maximum reaction of the olefin in the zone immediately adjacent to the feed inlet point.

While the foregoing and exemplary operations have served to illustrate specific applications of the invention, only such limitations should be imposed on the invention as are indicated in the appended claims.

What is claimed is:

1. In a continuous exothermic aldehyde synthesis process wherein olefinic compounds, carbon monoxide and hydrogen are contacted with a cobalt carbonylation catalyst in an adiabatic reaction zone to produce aldehydes containing one more carbon atom than said olefins, the improvement comprising controlling the temperature level of said adiabatic reaction zone and maintaining high concentration of cobalt carbonyl catalyst throughout the carbonylation reaction zone, which comprises the steps of contacting olefinic compounds, carbon monoxide and hydrogen in a reaction zone under carbonylation conditions comprising temperatures in the range of about 250 to about 375° F. and pressures in the range of about 2500 to about 3500 p. s. i. g. with a cobalt carbonylation catalyst, withdrawing from said reaction zone, liquid reaction products comprising aldehydes and containing dissolved cobalt carbonyl, passing said withdrawn products through a cooling zone into a separation zone, maintaining said separation zone at substantially the same pressure as said reaction zone, separating liquid products from uncondensed gases in said separation zone, recycling a portion of said cooled liquid products containing in solution substantial quantities of cobalt carbonyl to said reaction zone, and injecting at least a portion of said cooled recycled product into said reaction zone at a point close to a fresh olefinic feed injection point.

2. The process of claim 1 in which further portions of said recycled liquid products are injected into said reaction zone at a plurality of injection points spaced in the direction of flow of said reaction products through said reaction zone.

3. The process of claim 1 in which the temperature gradient existing in said reaction zone is in the range of from about 30° to about 100° F.

4. The process of claim 1 wherein cobalt is initially introduced into said adiabatic reaction zone in the form an oil-soluble cobalt soap.

WARREN M. SMITH.

REFERENCES CITED

The following references are of record in the file of this patent:

UNITED STATES PATENTS

| Number | Name | Date |
| --- | --- | --- |
| 2,161,974 | Peck | June 13, 1939 |
| 2,250,421 | Riblett | July 22, 1941 |
| 2,361,997 | Dreyfus | Nov. 7, 1944 |
| 2,406,851 | Redcay | Sept. 3, 1946 |
| 2,440,109 | Moore | Apr. 20, 1948 |
| 2,443,673 | Atwell | June 22, 1948 |

FOREIGN PATENTS

| Number | Country | Date |
| --- | --- | --- |
| 468,434 | Great Britain | June 29, 1937 |

OTHER REFERENCES

U. S. Technical Mission in Europe, "The Synthesis of Hydrocarbons and Chemicals from CO and $H_2$," Technical Report No. 248–45, September 1945, pages 122–128.